United States Patent
Burba et al.

(10) Patent No.: US 9,648,098 B2
(45) Date of Patent: May 9, 2017

(54) PREDICTIVE PEER DETERMINATION FOR PEER-TO-PEER DIGITAL CONTENT DOWNLOAD

(71) Applicant: Microsoft Technology Licensing, LLC, Redmond, WA (US)

(72) Inventors: Alexander Burba, Seattle, WA (US); Brandon T. Hunt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 200 days.

(21) Appl. No.: 14/724,586

(22) Filed: May 28, 2015

(65) Prior Publication Data
US 2016/0352817 A1 Dec. 1, 2016

(51) Int. Cl.
*G06F 15/16* (2006.01)
*H04L 29/08* (2006.01)

(52) U.S. Cl.
CPC ............ *H04L 67/104* (2013.01); *H04L 67/06* (2013.01); *H04L 67/1061* (2013.01); *H04L 67/1074* (2013.01); *H04L 67/108* (2013.01); *H04L 67/1072* (2013.01); *H04L 67/322* (2013.01); *H04L 67/34* (2013.01)

(58) Field of Classification Search
USPC ....... 709/225, 213, 203, 219, 224, 204, 205, 709/246, 227, 217
See application file for complete search history.

(56) References Cited

U.S. PATENT DOCUMENTS

| | | | |
|---|---|---|---|
| 7,814,154 B1 * | 10/2010 | Kandekar | A63F 13/35 463/42 |
| 8,606,846 B2 | 12/2013 | Czechowski, III et al. | |
| 8,924,460 B2 | 12/2014 | Collet et al. | |
| 9,292,894 B2 * | 3/2016 | MacIntosh | |

(Continued)

FOREIGN PATENT DOCUMENTS

| | | |
|---|---|---|
| CN | 1885823 | 12/2006 |
| WO | WO-03058910 | 7/2003 |

OTHER PUBLICATIONS

"International Search Report and Written Opinion", Application No. PCT/US2016/030622, Aug. 9, 2016, 13 pages.

(Continued)

*Primary Examiner* — Jude Jean Gilles

(57) ABSTRACT

Each computing device in a peer-to-peer network stores particular digital content. A computing device in the peer-to-peer network includes a peer prediction system that obtains an indication of digital content that has not been downloaded to the computing device but is predicted to be downloaded by the computing device in the future (e.g., in response to a user request for the digital content). The peer prediction system obtains a list of peer computing devices in the peer-to-peer network that have at least part of the digital content, and communicates with those peer computing devices to determine connectivity information for each of those peer computing devices. The computing device maintains a record of this connectivity information, and in response to a subsequent user request to download the (Continued)

digital content, uses the maintained record to determine which peer computing devices to access to obtain the digital content.

20 Claims, 5 Drawing Sheets

(56) References Cited

U.S. PATENT DOCUMENTS

| | | | |
|---|---|---|---|
| 2003/0050966 A1* | 3/2003 | Dutta | H04L 29/06 709/203 |
| 2003/0152034 A1 | 8/2003 | Zhang et al. | |
| 2003/0204602 A1 | 10/2003 | Hudson et al. | |
| 2007/0271380 A1 | 11/2007 | Chang | |
| 2008/0059631 A1* | 3/2008 | Bergstrom | H04N 7/17318 709/224 |
| 2008/0134258 A1 | 6/2008 | Goose et al. | |
| 2009/0281718 A1* | 11/2009 | Gibran | G01C 21/32 701/532 |
| 2010/0293294 A1 | 11/2010 | Hilt et al. | |
| 2011/0071841 A1* | 3/2011 | Fomenko | G06F 17/30206 705/1.1 |
| 2011/0131278 A1 | 6/2011 | Nieh et al. | |
| 2011/0238756 A1 | 9/2011 | Damola et al. | |
| 2012/0215850 A1 | 8/2012 | Kiesel et al. | |
| 2014/0095646 A1* | 4/2014 | Chan | G06F 17/30085 709/213 |
| 2014/0172968 A1 | 6/2014 | Burba | |
| 2014/0173022 A1* | 6/2014 | Morrison, III | H04L 67/1063 709/217 |

OTHER PUBLICATIONS

Adler, "Optimal Peer Selection for P2P Downloading and Streaming", In Proceedings of 24th Annual Joint Conference of the IEEE Computer and Communications Societies, Mar. 13, 2005, 12 pages.

Bernstein, "Adaptive Peer Selection", In Proceedings of the 2nd International Workshop on Peer-to-Peer Systems, Feb. 2003, 6 pages.

Madhyastha, "iPlane: An Information Plane for Distributed Services", In Proceedings of the 7th Symposium on Operating Systems Design and Implementation, Nov. 6, 2006, 25 pages.

Thilakarathna, "MobiTribe: Cost Efficient Distributed User Generated Content Sharing on Smartphones", In Proceedings: In IEEE Transactions on Mobile Computing, vol. 13, No. 9, Jul. 2013, 14 pages.

Wu, "Large-Scale Peer-To-Peer Streaming: Modeling, Measurements, and Optimizing Solutions", In Proceedings: in Doctor of Philosophy Thesis, Department of Electrical and Computer Engineering, University of Toronto Available at: <http://i.cs.hku.hk/~cwu/papers/ChuanWu_200807_PhD_thesis.pdf>, Jul. 2008, 261 pages.

Yan, "Highly Available Peers Based Web Cache against Flash Crowds", In Proceedings: In International Journal of Digital Content Technology and its Applications vol. 7, No. 16, Dec. 2013, 10 pages.

* cited by examiner

PREDICTIVE PEER DETERMINATION FOR PEER-TO-PEER DIGITAL CONTENT DOWNLOAD

BACKGROUND

As computing technology has advanced, computing devices have become increasingly powerful. This increase in computing device power has resulted in a wide variety of different digital content being available to users, such as various types of programs, various different movies, and so forth. Additionally, as computing devices have increasingly become interconnected via various networks, the distribution of digital content has migrated away from magnetic disks and optical discs to downloading of digital content via one or more networks. However, given the large size of much of the digital content that is available to users, downloading the digital content via one or more networks can take a significant amount of time. This can result in delays to users who desire to use the content in the near future, leading to user frustration with their computing devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an indication of digital content for which a download request is predicted to be received at the computing device is obtained. Prior to receiving the download request, an indication of a set of peer computing devices from which the computing device can obtain the digital content is obtained. Each of one or more peer computing devices in the set of peer computing devices is communicated with to determine connectivity information for each of the one or more peer computing devices, and a subset of the set of peer computing devices to use as source devices for the digital content is determined. In response to receiving the download request, one or more of the subset of peer computing devices are accessed to retrieve the digital content from the one or more of the subset of peer computing devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
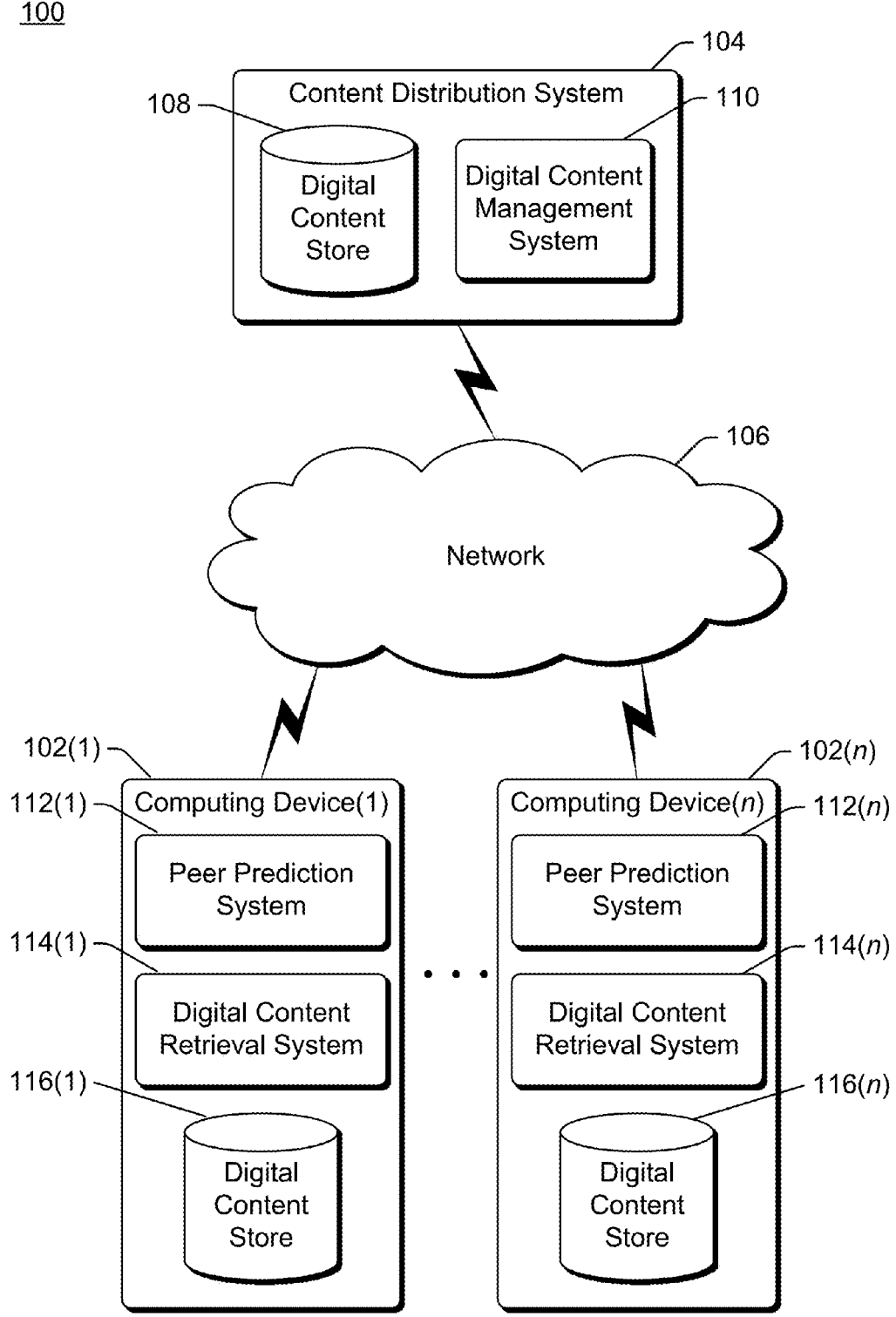
FIG. 1 illustrates an example system implementing the predictive peer determination for peer-to-peer digital content download in accordance with one or more embodiments.

Predictive peer determination for peer-to-peer digital content download is discussed herein. A computing device can obtain digital content from one or more other computing devices that are part of a peer-to-peer network. The peer-to-peer network refers to a collection of computing devices that can communicate with one another and each can provide digital content to one or more of the other computing devices in the collection. The responsibility of providing content to computing devices in the collection is shared among the computing devices in the collection, rather than having the responsibility lie solely on one or more particular computing devices (e.g., as in the server-client situation in which a server computing device has sole responsibility for providing digital content to the client computing device).

Each computing device in the peer-to-peer network stores particular digital content, which can be computer programs or portions thereof (e.g., updates to programs), audio/video content (e.g., movies), and so forth. Different computing devices can store different digital content, and some computing devices can store the same digital content. The particular digital content stored on a particular computing device varies based on the desires of the user of the computing device (e.g., the programs he or she desires to run, the movies he or she desires to watch, and so forth).

A computing device in the peer-to-peer network includes a peer prediction system that obtains an indication of digital content that has not been downloaded to the computing device but is predicted to be downloaded by the computing device in the future (e.g., in response to a user request for the digital content). Digital content can be predicted to be downloaded by the computing device for various reasons, such as based on the user's indicated digital content preferences, based on the type of digital content (e.g., updates to a program that is already installed on the computing device), and so forth. The peer prediction system obtains (e.g., from a content distribution system or the other computing devices in the peer-to-peer network) a list of computing devices in the peer-to-peer network that have the digital content. The computing device then communicates with the computing devices in that list and determines connectivity information (e.g., whether the computing devices are accessible, data transfer rates from the computing devices) for each of those computing devices. The computing device maintains a record of this connectivity information, and in response to a subsequent user request to download the digital content, uses the maintained record to determine which computing devices in the peer-to-peer network to access to obtain the digital content.

By using the techniques discussed herein, in response to a request for digital content, the computing device quickly knows which other computing devices in the peer-to-peer network can be accessed to obtain the digital content quickly (based on the record of connectivity information). As the connectivity information is already known, usability of the computing device is improved by providing the user with accurate information as to how long it will take to obtain the digital content. The techniques discussed herein also improve bandwidth usage, reducing the amount of bandwidth used by a service that can provide the digital content (due to the digital content being obtained from computing devices in the peer-to-peer network), while at the same time improving the performance of the computing devices due to making the digital content available more quickly (as a result of obtaining the digital content from a computing device in the peer-to-peer network rather than a separate service, and the record of connectivity information having already been generated).

FIG. 1 illustrates an example system 100 implementing the predictive peer determination for peer-to-peer digital content download in accordance with one or more embodiments. The system 100 includes multiple (n) computing devices 102(1), . . . , 102(n). The computing devices 102(1), . . . , 102(n) can each be a variety of different types of computing devices, and different ones of the computing devices 102(1), . . . , 102(n) can be the same or different types of devices. For example, each of computing devices 102(1), . . . , 102(n) can be a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), an entertainment device (e.g., an entertainment appliance, a set-top box communicatively coupled to a display device, a game console), a television or other display device, an automotive computer, and so forth. Thus, each of computing devices 102(1), . . . , 102(n) may range from a full resource device with substantial memory and processor resources (e.g., personal computers, game consoles) to a low-resource device with limited memory and/or processing resources (e.g., traditional set-top boxes, televisions).

The computing devices 102(1), . . . , 102(n) can communicate with one another, as well as optionally with a content distribution system 104, via a network 106. The network 106 can be any one or more of a variety of different networks, including the Internet, a local area network (LAN), a public telephone network, a cellular or other wireless phone network, a personal area network (PAN), an intranet, other public and/or proprietary networks, combinations thereof, and so forth. The content distribution system 104 can be implemented by any of a variety of different types of devices, such as any of the types discussed above with respect to the computing devices 102.

The content distribution system 104 includes a digital content store 108 and a digital content management system 110. The digital content store 108 stores digital content that can be provided to one or more computing devices 102. Computing devices 102 also obtain digital content from one another as part of a peer-to-peer network, as discussed in more detail below, although can alternatively obtain the digital content from the digital content management system 110 when desired, such as when the digital content is unavailable from any other computing devices as part of a peer-to-peer network. The digital content management system 110 maintains a record of which computing devices 102 have which digital content. The digital content management system 110 can obtain information regarding which computing devices 110 store which digital content in a variety of different manners, such as from the computing devices themselves (e.g., each computing device 102 notifies the digital content management system 110 when the computing device obtains particular digital content).

Each computing device 102 includes a peer prediction system 112, a digital content retrieval system 114, and a digital content store 116. The digital content store 116 of a computing device 102 stores a local copy or version of digital content for the computing device 102. The digital content maintained in the digital content store 116 of a computing device 102 can be obtained from various sources, such as from another computing device 102, the content distribution system 104, another distribution media, and so forth. Situations can arise in which the digital content store 116 of a particular computing device 102 stores only part of the digital content at any given time, such as when the computing device 102 is in the process of downloading the digital content.

The peer prediction system 112 of a computing device 102 obtains an indication of digital content that has not yet been downloaded to or otherwise obtained by the computing device 102 but that is predicted to be downloaded by the computing device in the future (e.g., in response to a user request for the digital content). The peer prediction system 112 of a particular computing device 102 identifies one or more other computing devices 102 in a peer-to-peer network from which the computing device can obtain the digital content, the identified one or more other computing devices 102 being based on connectivity information between the particular computing device 102 and the identified one or more computing devices 102. This identification is performed prior to receipt of a request at the computing device to download the digital content. In response to a request to download the digital content, the digital content retrieval system 114 obtains the requested digital content from the one or more computing devices 102 identified by the peer prediction system 112, and stores the obtained digital content in the digital content store 116. This operation of peer prediction system 112 is discussed in more detail below.

Figure 2:
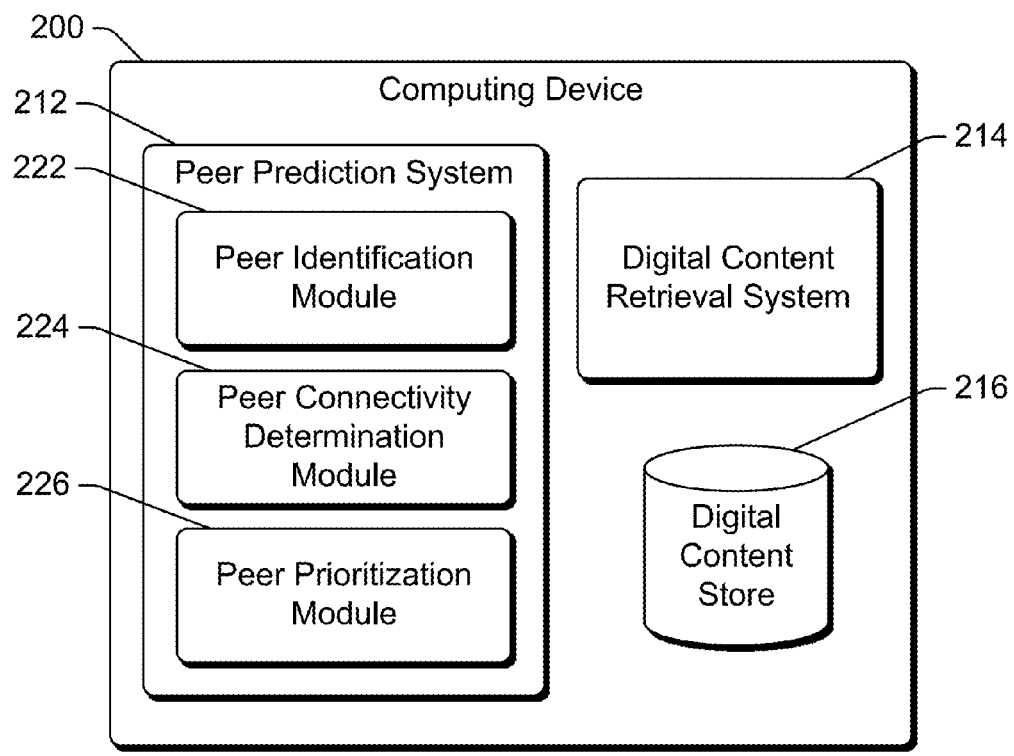
FIG. 2 is a block diagram illustrating an example computing device implementing a peer prediction system in accordance with one or more embodiments.

FIG. 2 is a block diagram illustrating an example computing device 200 implementing a peer prediction system in accordance with one or more embodiments. The computing device 200 can be any of the computing devices 102 of FIG. 1, and vice versa. The computing device 200 includes a peer prediction system 212 (which can be a peer prediction system 112 of FIG. 1, and vice versa), a digital content retrieval system 214 (which can be a digital content retrieval system 114 of FIG. 1, and vice versa), and a digital content store 216 (which can be a digital content store 116 of FIG. 1, and vice versa).

The digital content store 216 stores a local copy or version of digital content for the computing device 200. In response to a request to download particular digital content, the digital content retrieval system 214 obtains the requested digital content from one or more peer computing devices identified by the peer prediction system 212, and stores the obtained digital content in the digital content store 216 as discussed in more detail below. The digital content in the digital content store 216 can also be provided to one or more other peer computing devices in response to a request for the digital content (e.g., from one of such other peer computing devices).

The peer prediction system 212 includes a peer identification module 222, a peer connectivity determination module 224, and a peer prioritization module 226. The peer identification module 222 obtains a list of peers that have particular digital content. The particular digital content is digital content for which a download request is predicted to be received at the computing device 200. In one or more embodiments, the peer identification module 222 obtains an indication from another module, device, or service that identifies the particular digital content for which a download request is predicted to be received. This particular digital content can be identified in a variety of different manners, such as based on popularity of the digital content, based on other digital content already stored on the computing device 200 (e.g., download requests for updates to a program already installed on the computing device 200 can be predicted to be received at the computing device 200), based on preferences previously indicated by the user of the computing device 200 (e.g., movies the user of the computing device 200 has indicated he or she enjoys), and so forth.

In one or more embodiments, the peer identification module 222 obtains a list of peers that have the particular digital content from a remote service, such as the digital content management system 110 of FIG. 1. Additionally, or alternatively, the peer identification module 222 can obtain a list of peers that have the particular digital content from another computing device in a same peer-to-peer network as the computing device 200, or can generate a list of peers that have the particular digital content by querying the other computing devices in the same peer-to-peer network as the computing device 200 to identify the digital content stored on those other computing devices. For example, the digital content management system 110 of FIG. 1 can be implemented across the multiple computing devices 102 of FIG. 1.

Regardless of the source of the list of peers, the list of peers is a set of peer computing devices from which the computing device can obtain at least part of the particular digital content. A peer device refers to another computing device in a same peer-to-peer network as the computing device 200. The computing devices included in a peer-to-peer network can be determined in a variety of different manners using any of a variety of public and/or proprietary techniques. For example, the computing devices included in a peer-to-peer network can be identified by one another (e.g., broadcasting requests and seeing which other computing devices respond), by a remote service or system that monitors computing devices that desire to participate in a peer-to-peer network, and so forth.

The peer connectivity determination module 224 determines connectivity information for each of the peer computing devices identified by the peer identification module 222. The connectivity information for a peer computing device refers to a quality of a connection between the computing device and the peer computing device, the quality of the connection including the accessibility of the peer computing device to the computing device. The peer connectivity determination module 224 determines the connectivity information for a peer computing device by communicating a request to the peer computing device and analyzing the response (if any) received from the peer computing device. This analysis can include analyzing information provided by the peer computing device, such as data maintained by the peer computing device and provided by the peer computing device in the response (e.g., an indication of times of high data usage (such as when the peer computing device is typically streaming movies), an indication of times when the peer computing device is typically in a sleep mode, etc.). This analysis can also include analyzing the timing or other characteristics of the communication with the peer computing device, such as an amount of time taken to send the request to the peer computing device and receive a response from the peer computing device.

Table I includes examples of the connectivity information determined by the peer connectivity determination module 224. It should be noted that the examples of connectivity information included in Table I are examples, and that other connectivity information can additionally be obtained. Furthermore, it should be noted that some of the connectivity information discussed in Table I is not obtained by the peer connectivity determination module 224 in certain implementations.

TABLE I

| Connectivity Information | Description |
| --- | --- |
| Accessibility | Whether the peer computing device can be accessed. E.g., the peer computing device is powered on and connected to a network. |
| Data transfer speed | A data transfer speed or bandwidth for transferring data from the peer computing device to the computing device. |
| Up time | An amount of time that the peer computing device has been running (e.g., since last powered down, since last entering a sleep mode, etc.). |
| Connection stability | The reliability or stability of the connection to the peer computing device. E.g., how frequently the computing device attempts to access the peer computing device and determines that the peer computing device can be accessed, how frequently a connection with the peer computing device is dropped and needs to be re-established. |
| Usage data | Times of high or low bandwidth usage by the peer computing device. Different computing devices are used in different manners, and the connectivity information can include indications of this high or low usage (e.g., which can be taken into account as discussed below so that the peer computing device is not burdened with transferring digital content at times when the peer computing device is typically experiencing high usage). |

The peer prioritization module 226 analyzes the connectivity information obtained by the peer identification module 222 and determines a subset of peer computing devices to use as source devices for the particular content. The peer identification module 226 can apply any of a variety of different rules or criteria to the connectivity information to determine the subset of peer computing devices. In one or more embodiments, the peer identification module 226 orders the peer computing devices that are accessible from highest priority to lowest priority, with the peer computing device having the largest data transfer speed being the highest priority and the peer computing devices having the smallest data transfer speeding being the lowest priority. This ordering can also include removing certain peer computing devices that do not satisfy particular constraints from the subset of computing devices. For example, this ordering can include removing from the subset of peer computing devices those computing devices that are determined to not be accessible. By way of another example, this ordering can further include removing from the subset of peer computing devices certain peer computing devices at certain times (e.g., during times of the day or days of the week that the usage data indicates are high usage for the peer computing device).

Alternatively, the peer identification module 226 can assign weights to different connectivity information based on their perceived importance (e.g., a higher weight is applied to the data transfer speed connectivity information than is applied to the up time connectivity information), and these weights can be applied to a value representing the connectivity information. These weighted values can then be combined (e.g., added together) to determine the priority for the peer computing device.

Figure 3:
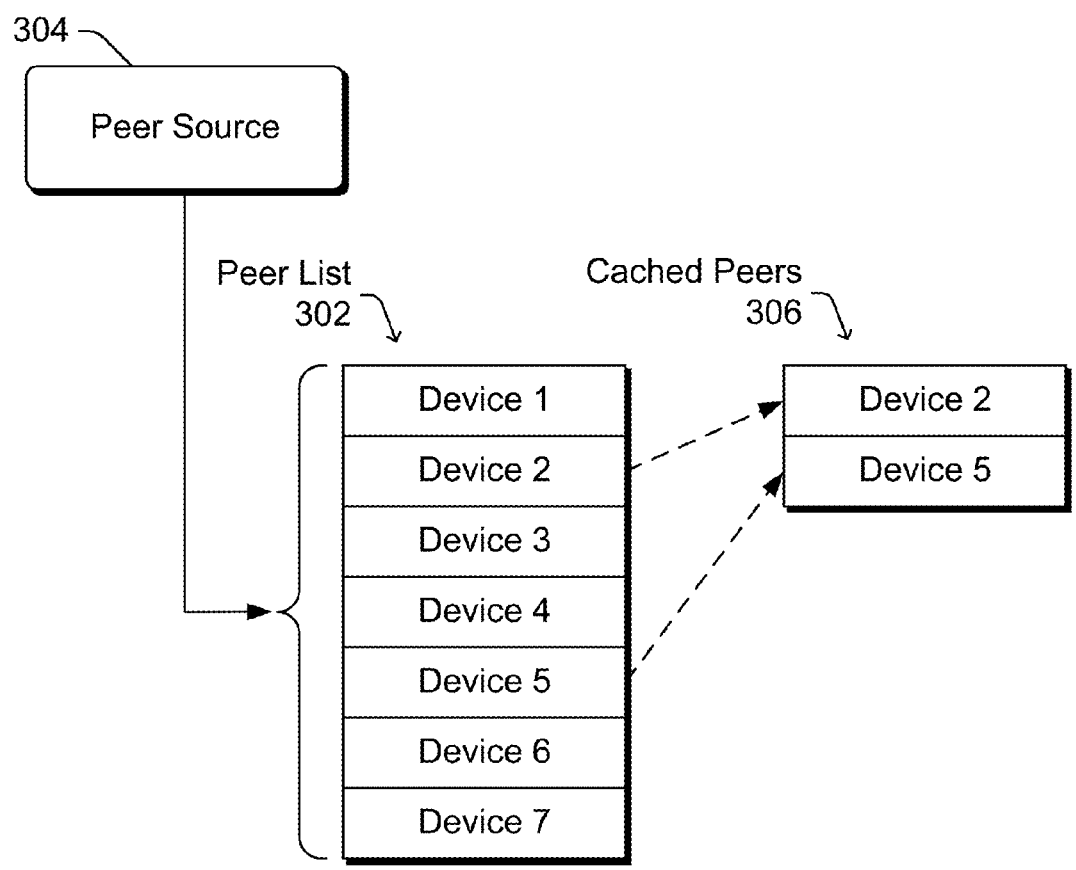
FIG. 3 illustrates an example system caching a subset of peer computing devices in accordance with one or more embodiments.

In one or more embodiments, the peer identification module 226 determines a subset of peer computing devices to use as source devices for the particular content, and maintains a cache or record of that subset of peer computing devices. This set of peer computing devices can be determined using various rules or criteria, such as one or more peer computing devices having a data transfer speed that satisfies (e.g., is greater than, or is greater than or equal to) a threshold value (e.g., has a data transfer speed within 5% of the largest data transfer speed of the peer computing devices), a threshold number (e.g., three or five) of the one or more peer computing devices having a largest data transfer speed). FIG. 3 illustrates an example system 300 caching a subset of peer computing devices in accordance with one or more embodiments.

In the system 300, a list 302 of peer computing devices that have particular digital content is obtained from one or more peer sources 304. The one or more peer sources 304 can be various sources as discussed above, such as the digital content management system 110 of FIG. 1 or other peer computing devices. As illustrated in FIG. 3, seven different computing devices are included in the peer list 302, each of those seven computing devices having at least part of the particular digital content.

A subset of the peer computing devices that have at least part of the particular digital content is generated, and stored as a set of cached peer computing devices 306. This subset of peer computing devices is determined by the peer prioritization module 226. As illustrated in FIG. 3, two of the computing devices in the peer list 302 are included in the set of cached peers 306.

Returning to FIG. 2, rather than maintaining a cache or record of a subset of peer computing devices, the peer computing devices that have the particular digital content can be sorted based on their priority. The priority level or value of a particular peer computing device is generated and maintained by the peer prioritization module 226.

The peer prioritization module 226 can optionally identify different peer computing devices to use as source devices at different times (e.g., different times of the day or different days of the week). This information can be maintained by the peer prioritization module 226 in different manners, such as included along with identifiers of computing devices in the set of cached peers 306 of FIG. 3. For example, the peer prioritization module 226 can determine that a particular peer computing device A has a highest data transfer rate to the computing device 200 but is typically in a sleep mode from midnight to 6 am, and thus is to be used as a source device for the digital content at times other than midnight to 6 am. The peer prioritization module 226 can further determine that another peer computing device B has a lower data transfer rate than the peer computing device A but is not typically in a sleep mode from midnight to 6 am, and thus is to be used as a source device for the digital content from midnight to 6 am. If a request to download digital content were received at 11:00 PM, then the digital content retrieval system 214 can access the peer computing device A from 11:00 PM to midnight to obtain part of the digital content from the peer computing device A, and then access the peer computing device B from midnight to 3:00 AM to obtain the remainder of the digital content from the peer computing device B.

It should be noted that the identification of peers, determination of connectivity information, and peer prioritization is performed by the peer prediction system 212 for particular digital content prior to a request for the particular digital content to be downloaded to the computing device. In response to a request for the particular digital content, the digital content retrieval system 214 accesses one or more of the peer computing devices that have at least part of the particular digital content and the accessed one or more peer computing devices send a copy of at least part of the particular digital content to the computing device 200. The download request can be a variety of different types of requests, such as a user request (e.g., a user input to download particular digital content), a device request (e.g., from another component or module of the computing device 200, such as a program update module), and so forth.

In one or more embodiments, the digital content retrieval system 214 accesses all of the peer computing devices in the subset of peer computing devices generated by the peer prioritization module 226. For example, referring again to FIG. 3, the digital content retrieval system 214 can access and obtain part of the particular digital content from each of the two computing devices identified in the cached peers 306. Which parts of the particular digital content are obtained from which of the two computing devices can be determined in various different manners by the digital content retrieval system 214 using any of a variety of public and/or proprietary techniques.

Alternatively, the digital content retrieval system 214 accesses less than all of the peer computing devices in the list of peer computing devices generated by the peer prioritization module 226. For example, the digital content retrieval system 214 can access one of the two computing devices identified in the cached peers 306 of FIG. 3. By way of another example, the digital content retrieval system 214 can access a particular number (e.g., one or two) of the highest priority cached peers determined by the peer prioritization module 226.

Thus, in response to a request to download particular digital content, the peer computing devices that have the particular digital content have already been identified by the peer prediction system 212. Furthermore, the priority or desirability of obtaining that particular digital content from those peer computing devices that have the particular digital content has already been determined by the peer prediction system 212. This allows the digital content retrieval system 214 to quickly begin downloading the particular digital content from the appropriate one or more peer computing devices (e.g., those peer computing devices from which the particular digital content can be retrieved most quickly (e.g., having the highest data transfer speeds). The connectivity information (e.g., data transfer speed) along with the known size of the digital content also allows the digital content retrieval system 214 to accurately determine an approximate (e.g., within a threshold amount) amount of time it will take to download the digital content, and this amount of time can be displayed by the digital content retrieval system 214. Because the one or more peer devices from which the digital content will be downloaded have been previously determined by the peer prediction system 212, the amount of time it will take to download the digital content can be accurately estimated by the digital content retrieval system 214, resulting in an accurate estimate quickly being presented to the user.

It should be noted that the peer prediction system 212 performs the peer identification, connectivity information determination, and peer prioritization for each of multiple different digital contents. Different digital content can be stored by different peer computing devices, and thus peer computing devices can be prioritized in different manners for different digital content. However, it should also be noted that the peer prediction system 212 can share some information when performing the peer identification, connectivity information determination, and peer prioritization for each of multiple different digital contents. For example, if the same peer computing device is identified as having both digital content A and digital content B, then if the connectivity information is obtained for the peer computing device when determining the peer prioritization for digital content A, that same connectivity information can be used when determining the peer prioritization for digital content B. The processing power of the computing device 200 as well as the peer computing device, and the network data bandwidth, thus need not be expended to determine the connectivity information for the computing device when determining the peer prioritization for digital content B.

In one or more embodiments, the peer prediction system 212 performs the peer identification, connectivity information determination, and peer prioritization for each of multiple different digital contents at regular or irregular intervals. The peer identification, connectivity information determination, and peer prioritization for each of multiple different digital contents is thus repeated over time, allowing the peer prioritization module 226 to identify different subsets of peer computing devices as the connectivity information changes over time. All of the peer identification, connectivity information determination, and peer prioritization for particular digital content can be repeated, or only part of the peer identification, connectivity information determination, and peer prioritization for particular digital content can be repeated. For example, the connectivity information determination and peer prioritization may be repeated for particular digital content, but the peer identification not repeated (or alternatively the peer identification can be repeated less frequently than the connectivity information determination and peer prioritization are repeated).

In one or more embodiments, the digital content retrieval system 214 obtains all of the digital content from a particular one of the peer computing devices identified by the peer prediction system 212. Alternatively, the digital content can be separated into multiple pieces (e.g., different code modules, parts of the digital content of a particular size (e.g., 100 Megabytes)), and the digital content retrieval system 214 can obtain different pieces of the digital content from different ones of the peer computing devices. For example, the peer identification module 222 can obtain an indication of peer devices that have at least one piece of the digital content, and the peer connectivity determination module 224 can obtain, as part of determining the connectivity information, an indication from the different peer computing devices of which pieces of the digital content those peer computing devices have. The peer prioritization module 226 can use this information to identify a particular one or more peer computing devices for each piece of the digital content (e.g., for each piece of the digital content, one peer computing device having a fastest data transfer rate of the identified peer computing devices), and the digital content retrieval system 214 can obtain the pieces of the digital content from those identified peer computing devices.

Figure 4:
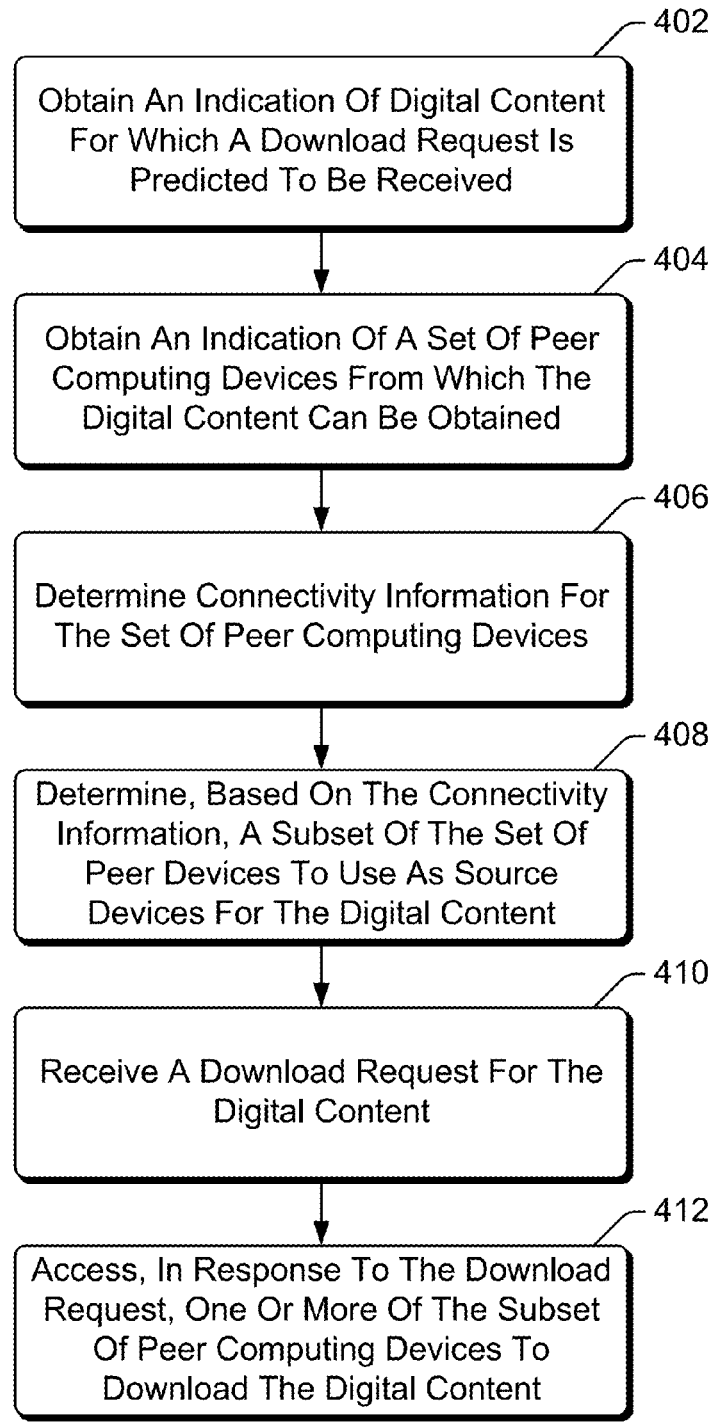
FIG. 4 is a flowchart illustrating an example process for implementing the predictive peer determination for peer-to-peer digital content download in accordance with one or more embodiments.

FIG. 4 is a flowchart illustrating an example process 400 for implementing the predictive peer determination for peer-to-peer digital content download in accordance with one or more embodiments. Process 400 is carried out by a computing device, such as a computing device 102 of FIG. 1 or a computing device 200 of FIG. 2, and can be implemented in software, firmware, hardware, or combinations thereof. Process 400 is shown as a set of acts and is not limited to the order shown for performing the operations of the various acts. Process 400 is an example process for implementing the predictive peer determination for peer-to-peer digital content download; additional discussions of implementing the predictive peer determination for peer-to-peer digital content download are included herein with reference to different figures.

In process 400, an indication of digital content for which a download request is predicted to be received is obtained (act 402). This indication can be obtained in various manners, such as from another module, device, or service as discussed above.

An indication of a set of peer computing devices is obtained, the set of peer computing devices being peer computing devices from which the digital content can be obtained (act 404). The indication can be obtained from various sources, such as other peer computing devices or from a content distribution system. The set of peer computing devices can be determined in various manners, such as randomly, based on geographic distance between the computing device implementing the process 400 and other peer computing devices, based on other rules or criteria, and so forth.

Connectivity information for the set of peer computing devices is determined (act 406). The set of peer computing devices is the set of peer computing devices indicated in act 404. The connectivity information is obtained by communicating requests to the peer computing devices and analyzing the responses (if any) received from the peer computing devices.

Based on the connectivity information, a subset of the set of peer computing devices is determined as the source devices for the digital content (act 408). This determination can be made by applying various different rules, criteria, or constraints to the connectivity information for the peer computing devices indicated in act 404 as discussed above.

A download request is received for the digital content (act 410). The download request can be received from various different sources as discussed above, such as a user of the computing device implementing the process 400, another component or module of the computing device implementing the process 400, and so forth.

In response to the download request, one or more of the subset of peer computing devices determined as the source devices in act 408 are accessed to download the content (act 412). The digital content is downloaded from those peer computing devices, and can be downloaded from all of the subset of peer computing devices or less than all of the subset of peer computing devices as discussed above.

As discussed above, the acts 402-408 are performed prior to receipt of the download request in act 410. Thus, in response to receipt of the download request in act 410, the subset of the set of peer computing devices to use as source devices has already been determined in act 408. This can result in improved performance of the computing device implementing the process 400 due to making the digital content available more quickly (as a result of obtaining the digital content from a computing device in the peer-to-peer network rather than a separate service, and the record of connectivity information having been used to already determine, prior to receipt of the download request in act 410, the subset of the set of peer computing devices to use as source devices).

In one or more embodiments, the connectivity information determined in act 406 is also returned to the content distribution system or computing devices from which the indication of the set of peer computing devices was obtained in act 404. This allows such a system or computing devices to use connectivity information when subsequently determining which set of peer computing devices to indicate other digital content can be obtained. For example, the connectivity information may indicate that a particular set of peer computing devices allow fast data transfer for digital content A to a computing device A in a particular geographic area (e.g., a particular city or portion of a city). If a set of peer computing devices for another computing device B to obtain different digital content B is received, and computing device B is in that particular geographic area, to the extent the set of peer computing devices that allow fast data transfer to computing device A also include the digital content B, those computing devices can be included in the set of peer computing devices provided to computing device B because it can be assumed that those computing devices also provide fast data transfer to computing device B.

It should be noted that the digital content discussed herein can be any of a variety of different types of forms of digital content. For example, the digital content can be programs (e.g., productivity programs, recreational programs such as games, educational programs, operating system or other utility programs, etc.), portions of programs (e.g., updates to previously installed programs), audio/video content (e.g., movies), and so forth.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
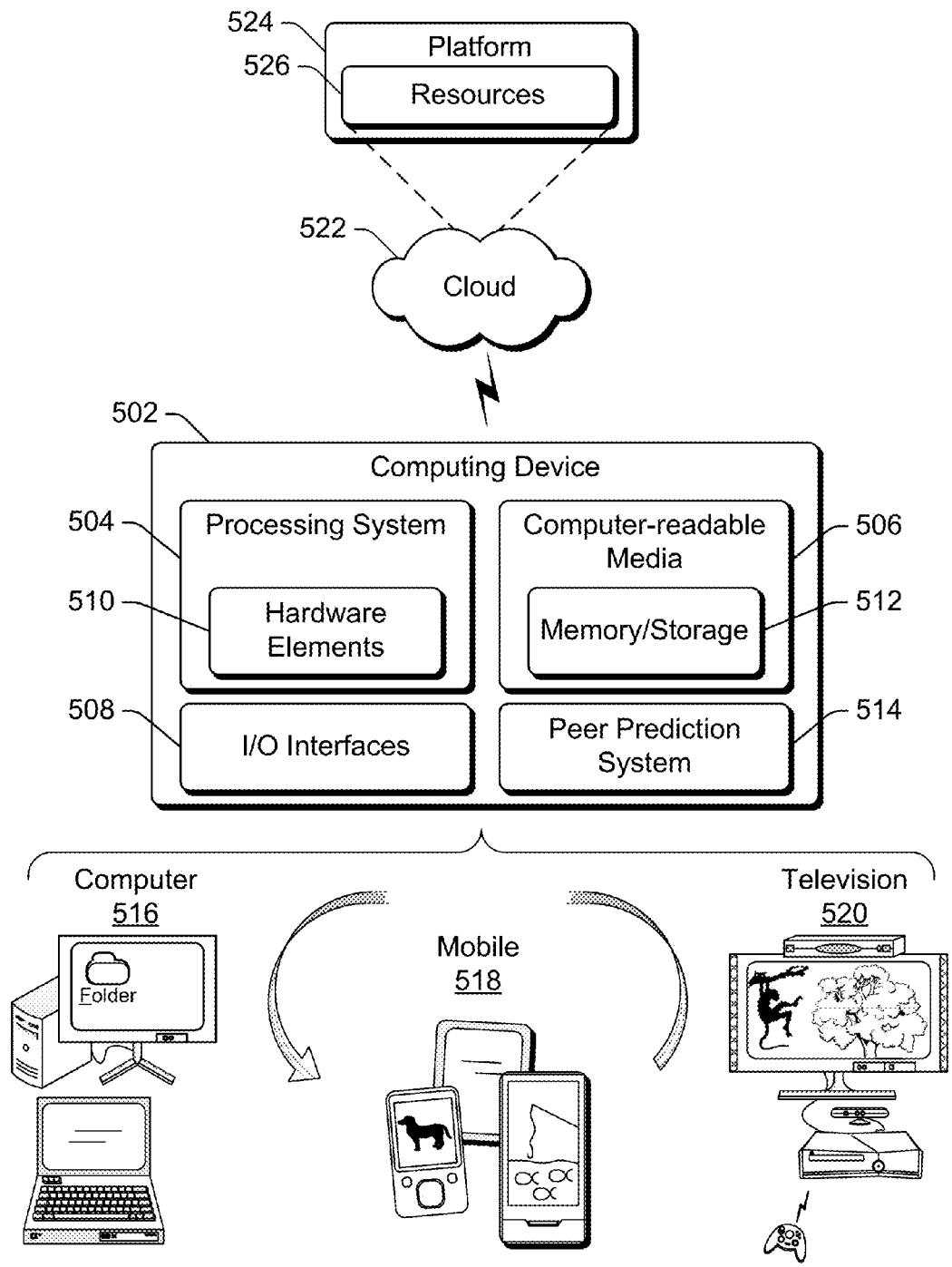
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

The one or more input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), a network card (or other communication module), and so forth. Examples of output devices include a display device (e.g., a monitor or projector), speakers, a printer, a network card (or other communication module), tactile-response device, and so forth. Thus, the computing device 502 may be configured in a variety of ways as further described below to support user interaction.

The computing device 502 also includes a peer prediction system 14. The peer prediction system 514 provides various functionality to determine peer computing devices from which digital content is predicted to be downloaded as discussed above. The peer prediction system 514 can implement, for example, a peer prediction system 112 of FIG. 1 or the peer prediction system 212 of FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A computing device comprising: a peer identification module configured to determine, prior to receiving a download request for digital content that is predicted to be downloaded to the computing device, a set of peer computing devices that have the digital content that is predicted to be downloaded to the computing device; a peer connectivity determination module configured to communicate with each of one or more peer computing devices in the set of peer computing devices to determine connectivity information for each of the one or more peer computing devices; a peer prioritization module configured to determine a subset of the set of peer computing devices to use as source devices for the digital content; and a digital content retrieval system configured to access, in response to receiving the download request, one or more of the subset of peer computing devices to retrieve the digital content from the one or more of the subset of peer computing devices, effective to make the digital content available to the computing device more quickly due to the subset of peer computing devices being already determined.

Alternatively or in addition to any of the above described computing devices, any one or combination of: the peer prioritization module being further configured to record in a cache indications of each peer computing device in the subset of peer computing devices; the peer prioritization module being further configured to repeatedly, over time, determine the subset of peer computing devices to use as source devices for the digital content, and record in the cache indications of each peer computing device in the subset of peer computing devices as the connectivity information changes over time; the download request comprising a user request to download the digital content; the digital content comprising an update to a program installed on the computing device, and the download request comprising a request from a component of the computing device to download the digital content.

A computing device comprising: a digital content store; a peer prediction system configured to determine, by communicating with a set of peer computing devices that store particular digital content prior to receipt of a request to download the particular digital content, a data transfer speed from each of the set of peer computing devices and further to prioritize the set of peer computing devices based on the data transfer speeds of the set of peer computing devices; and a digital content retrieval system configured to, in response to a request to download the particular digital content, communicate with one or more of the set of peer computing devices to download the particular digital content from the one or more of the set of peer computing devices and store the particular digital content in the digital content store, effective to make the particular digital content available to the computing device more quickly due to the set of peer computing devices having already been prioritized.

Alternatively or in addition to any of the above described computing devices, any one or combination of: the peer prediction system being further configured to determine, by communicating with the set of peer computing devices, whether each of the set of peer computing devices is accessible to the computing device, and prioritize the set of peer computing devices based on the data transfer speeds of the set of peer computing devices as well as which of the set of peer computing devices is accessible to the computing device; the digital content retrieval system being further configured to select, as the one or more of the set of peer computing devices, at least one of the set of peer computing devices having a higher priority than others of the set of peer computing devices; the digital content being made up of multiple pieces, and for each of the multiple pieces: the peer prediction system being further configured to determine one of the set of peer computing devices having at least a threshold data transfer speed to the computing device, and the digital content retrieval system being further configured to obtain, from the one of the set of peer computing devices having at least the threshold data transfer speed, the piece of the digital content.

A method implemented in a computing device, the method comprising: obtaining an indication of digital content for which a download request is predicted to be received at the computing device; obtaining, prior to receiving the download request, an indication of a set of peer computing devices from which the computing device can obtain the digital content; communicating with each of one or more peer computing devices in the set of peer computing devices to determine connectivity information for each of the one or more peer computing devices; determining a subset of the set of peer computing devices to use as source devices for the digital content; and accessing, in response to receiving the download request, one or more of the subset of peer computing devices to retrieve the digital content from the one or more of the subset of peer computing devices, effective to make the digital content available to the computing device more quickly due to the subset of peer computing devices being already determined.

Alternatively or in addition to any of the above described methods, any one or combination of: the connectivity information for a peer computing device indicating a quality of a connection between the computing device and the peer computing device; the connectivity information including whether each of the one or more peer computing devices is accessible to the computing device; the connectivity information including a data transfer speed from each of the one or more peer computing devices; the download request comprising a user request to download the digital content; the download request comprising a request from a component of the computing device to download the digital content; the obtaining the indication of the set of peer computing devices comprising obtaining the indication of the set of peer computing devices from a remote service; the obtaining the indication of the set of peer computing devices comprising obtaining the indication of the set of peer computing devices from at least one of the set of peer computing devices; the method further comprising recording in a cache indications of each peer computing device in the subset of peer computing devices; the method further comprising repeating, over time, the obtaining the indication of the set of peer computing devices, the communicating to determine connectivity information, the determining the subset of peer computing devices, and the recording in the cache as the connectivity information changes over time; the digital content being made up of multiple pieces, and for each of the multiple pieces: the determining comprising determining one of the set of peer computing devices having at least a threshold data transfer speed to the computing device, and the accessing comprising obtaining, from the one of the set of peer computing devices having at least the threshold data transfer speed, the piece of the digital content.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
   a peer identification module configured to determine, prior to receiving a download request for digital content that is predicted to be downloaded to the computing device, a set of peer computing devices that have the digital content that is predicted to be downloaded to the computing device;
   a peer connectivity determination module configured to communicate with each of one or more peer computing devices in the set of peer computing devices to determine connectivity information for each of the one or more peer computing devices;
   a peer prioritization module configured to determine a subset of the set of peer computing devices to use as source devices for the digital content; and
   a digital content retrieval system configured to access, in response to receiving the download request, one or more of the subset of peer computing devices to retrieve the digital content from the one or more of the subset of peer computing devices.

2. The computing device as recited in claim 1, the peer prioritization module being further configured to record in a cache indications of each peer computing device in the subset of peer computing devices.

3. The computing device as recited in claim 2, the peer prioritization module being further configured to repeatedly, over time, determine the subset of peer computing devices to use as source devices for the digital content, and record in the cache indications of each peer computing device in the subset of peer computing devices as the connectivity information changes over time.

4. The computing device as recited in claim 1, the download request comprising a user request to download the digital content.

5. The computing device as recited in claim 1, the digital content comprising an update to a program installed on the computing device, and the download request comprising a request from a component of the computing device to download the digital content.

6. A computing device comprising:
   a digital content store;
   a peer prediction system configured to determine, by communicating with a set of peer computing devices that store particular digital content prior to receipt of a request to download the particular digital content, a data transfer speed from each of the set of peer computing devices and further to prioritize the set of peer computing devices based on the data transfer speeds of the set of peer computing devices; and
   a digital content retrieval system configured to, in response to a request to download the particular digital content, communicate with one or more of the set of peer computing devices to download the particular digital content from the one or more of the set of peer computing devices and store the particular digital content in the digital content store.

7. The computing device as recited in claim 6, the peer prediction system being further configured to determine, by communicating with the set of peer computing devices, whether each of the set of peer computing devices is accessible to the computing device, and prioritize the set of peer computing devices based on the data transfer speeds of the set of peer computing devices as well as which of the set of peer computing devices is accessible to the computing device.

8. The computing device as recited in claim 6, the digital content retrieval system being further configured to select, as the one or more of the set of peer computing devices, at least one of the set of peer computing devices having a higher priority than others of the set of peer computing devices.

9. The computing device as recited in claim 6, the digital content being made up of multiple pieces, and for each of the multiple pieces:
   the peer prediction system being further configured to determine one of the set of peer computing devices having at least a threshold data transfer speed to the computing device; and
   the digital content retrieval system being further configured to obtain, from the one of the set of peer computing devices having at least the threshold data transfer speed, the piece of the digital content.

10. A method implemented in a computing device, the method comprising:
    obtaining an indication of digital content for which a download request is predicted to be received at the computing device;
    obtaining, prior to receiving the download request, an indication of a set of peer computing devices from which the computing device can obtain the digital content;
    communicating with each of one or more peer computing devices in the set of peer computing devices to determine connectivity information for each of the one or more peer computing devices;
    determining a subset of the set of peer computing devices to use as source devices for the digital content; and
    accessing, in response to receiving the download request, one or more of the subset of peer computing devices to retrieve the digital content from the one or more of the subset of peer computing devices.

11. The method as recited in claim 10, the connectivity information for a peer computing device indicating a quality of a connection between the computing device and the peer computing device.

12. The method as recited in claim 10, the connectivity information including whether each of the one or more peer computing devices is accessible to the computing device.

13. The method as recited in claim 10, the connectivity information including a data transfer speed from each of the one or more peer computing devices.

14. The method as recited in claim 10, the download request comprising a user request to download the digital content.

15. The method as recited in claim 10, the download request comprising a request from a component of the computing device to download the digital content.

16. The method as recited in claim 10, the obtaining the indication of the set of peer computing devices comprising obtaining the indication of the set of peer computing devices from a remote service.

17. The method as recited in claim 10, the obtaining the indication of the set of peer computing devices comprising obtaining the indication of the set of peer computing devices from at least one of the set of peer computing devices.

18. The method as recited in claim 10, the method further comprising recording in a cache indications of each peer computing device in the subset of peer computing devices.

19. The method as recited in claim 18, the method further comprising repeating, over time, the obtaining the indication of the set of peer computing devices, the communicating to determine connectivity information, the determining the subset of peer computing devices, and the recording in the cache as the connectivity information changes over time.

20. The method as recited in claim 10, the digital content being made up of multiple pieces, and for each of the multiple pieces:
- the determining the subset of the set of peer computing devices comprising determining one of the set of peer computing devices having at least a threshold data transfer speed to the computing device; and
- the accessing one or more of the subset of peer computing devices comprising obtaining, from the one of the set of peer computing devices having at least the threshold data transfer speed, the piece of the digital content.

* * * * *